United States Patent
Yoshimatsu et al.

(10) Patent No.: US 7,659,677 B2
(45) Date of Patent: Feb. 9, 2010

(54) ROTATION BRAKE METHOD AND DEVICE FOR WORKING MACHINE

(75) Inventors: Hideaki Yoshimatsu, Kobe (JP); Masayuki Komiyama, Kobe (JP); Naoki Sugano, Kobe (JP); Koji Inoue, Kobe (JP)

(73) Assignees: Kobelco Construction Machinery Co., Ltd., Hiroshima-shi (JP); Kabushiki Kaisha Kobe Seiko Sho (Kobe Steel, Ltd.), Kobe-shi (JP)

( * ) Notice: Subject to any disclaimer, the term of this patent is extended or adjusted under 35 U.S.C. 154(b) by 659 days.

(21) Appl. No.: 11/547,525

(22) PCT Filed: Mar. 31, 2005

(86) PCT No.: PCT/JP2005/006305

§ 371 (c)(1),
(2), (4) Date: Oct. 2, 2006

(87) PCT Pub. No.: WO2005/095719

PCT Pub. Date: Oct. 13, 2005

(65) Prior Publication Data

US 2007/0273316 A1 Nov. 29, 2007

(30) Foreign Application Priority Data

Apr. 2, 2004 (JP) .............................. 2004-109963

(51) Int. Cl.
*H02P 3/00* (2006.01)
*H02K 7/10* (2006.01)
*H02K 17/32* (2006.01)

(52) U.S. Cl. ...................... 318/371; 318/362; 318/372; 318/375; 318/461

(58) Field of Classification Search ................. 318/362, 318/364, 370–372, 461, 798, 799, 822, 823
See application file for complete search history.

(56) References Cited

U.S. PATENT DOCUMENTS

| 6,725,581 | B2 * | 4/2004 | Naruse et al. ................. 37/348 |
| 6,851,207 | B2 * | 2/2005 | Yoshimatsu ................... 37/348 |
| 7,067,999 | B2 * | 6/2006 | Sugano et al. ............... 318/372 |
| 7,345,441 | B2 * | 3/2008 | Yoshimatsu ................ 318/372 |
| 2005/0253542 | A1 * | 11/2005 | Sugano et al. .............. 318/371 |

(Continued)

FOREIGN PATENT DOCUMENTS

JP 07061769 A * 3/1995

(Continued)

*Primary Examiner*—Walter Benson
*Assistant Examiner*—Eduardo Colon
(74) *Attorney, Agent, or Firm*—Oblon, Spivak, McClelland, Maier & Neustadt, L.L.P.

(57) ABSTRACT

To stop, in an emergency, a revolving superstructure quickly from rotating while preventing damage of a mechanical brake. A revolving superstructure is driven swiveling using a permanent magnetic-type swiveling electric motor; in an emergency, such as a malfunction in a drive or control system for the swiveling electric motor, allowing electric power generated in the electric motor due to inertial rotation to be consumed in an external braking resistor so as to make an electric braking action; and a mechanical brake is activated to stop the rotation and hold the stopped revolving superstructure when a rotation speed of the revolving superstructure becomes equal to or lower than a preset value.

11 Claims, 6 Drawing Sheets

U.S. PATENT DOCUMENTS

2007/0096670 A1* 5/2007 Hashimoto et al. .......... 318/369
2008/0201045 A1* 8/2008 Kagoshima et al. ........... 701/50

FOREIGN PATENT DOCUMENTS

| JP | 10 150755 | 6/1998 |
| JP | 2001 11897 | 1/2001 |
| JP | 2001 207478 | 8/2001 |
| JP | 2004 36304 | 2/2004 |

* cited by examiner

ROTATION BRAKE METHOD AND DEVICE FOR WORKING MACHINE

TECHNICAL FIELD

The present invention relates to a work machine designed to drivingly swivel a revolving superstructure using an electric motor, and more specifically to a method and a system for braking the revolving superstructure in an emergency caused by interruption in power supply to a drive system for the swiveling electric motor, failure in a control system for the swiveling electric motor, etc.

BACKGROUND ART

For swivel-type work machines, such as an excavator or a crane, there has been known a technique of employing an electric motor as a swivel driving source, in place of a traditional hydraulic motor, as disclosed in the following Patent Publication 1.

This conventional technique uses the electric motor also as a power generator to brake/stop a revolving superstructure by a regenerative braking torque from the power generating action.

[Patent Publication 1] Japanese Patent Laid-Open Publication No. 2001-207478

In the event of a malfunction such that power supply to the swiveling electric motor is interrupted due to a failure of a power generator, etc., or the swiveling electric motor becomes out of control due to a failure in a swivel control system, the above conventional technique will involve a situation where only inertia of the revolving superstructure acts on the electric motor as with a neutral free mode in a hydraulic motor-based system, without any braking based on the power generating action of the electric motor, and it will take time to stop the revolving superstructure.

A shovel or crane is also equipped with a mechanical brake serving as a stop-holding parking brake in a rotationally stopped state. Thus, it is contemplated to allow the mechanical brake to be activated as an emergency brake.

However, the mechanical brake originally has only a brake performance designed for a stop-holding brake. Therefore, if the mechanical brake is activated during a high-speed rotation, it is likely to be damaged due to lack of its own heat capacity. Providing the mechanical brake with a sufficient heat capacity, requires a cooling device, etc., which increase a size of the entire mechanical brake. That results in poor practicality in terms of installation space and cost.

SUMMARY OF THE INVENTION

In view of the above circumstances, it is an object of the present invention to provide a method and system for braking a revolving superstructure of a work machine, which is capable of quickly decelerating/rotationally stopping the revolving superstructure in an emergency while preventing damage of a mechanical brake.

In order to solve the above problems, the present invention employs the following features.

Specifically, the present invention provides a method for braking a revolving superstructure of a work machine, which comprises: employing a permanent magnet-type electric motor as a swiveling electric motor for drivingly swiveling the revolving superstructure; in an emergency, allowing electric power generated in the swiveling electric motor due to inertial rotation to be consumed in a braking resistor outside the swiveling electric motor to provide an electric braking action, said braking action providing braking and decelerating the revolving superstructure by the electric braking action; and activating a mechanical brake when a rotation speed of the revolving superstructure becomes equal to or less than a preset value during the decelerating.

The present invention also provides a system for braking a revolving superstructure of a work machine, which comprises a swiveling electric motor for drivingly swiveling the revolving superstructure, a mechanical brake for mechanically braking the swiveling electric motor, control means for controlling respective operations of the swiveling electric motor and the mechanical brake, and speed detection means for detecting a rotation speed of the revolving superstructure. The swiveling electric motor is composed using a permanent magnet-type electric motor designed to make an electric braking action by allowing electric power generated due to inertial rotation to be consumed in a braking resistor outside the swiveling electric motor, and the control means is adapted, in an emergency, to allow the swiveling electric motor to make the electric braking action, and to activate the mechanical brake, based on a speed signal generated from the speed detection means, when the rotation speed of the revolving superstructure becomes equal to or less than a preset value by the electric braking action.

These and other objects, features, aspects, and advantages of the present invention will become more apparent from the following detailed description of the preferred embodiments/examples with reference to the accompanying drawings.

DESCRIPTION OF THE PREFERRED EMBODIMENTS

Figure 1:
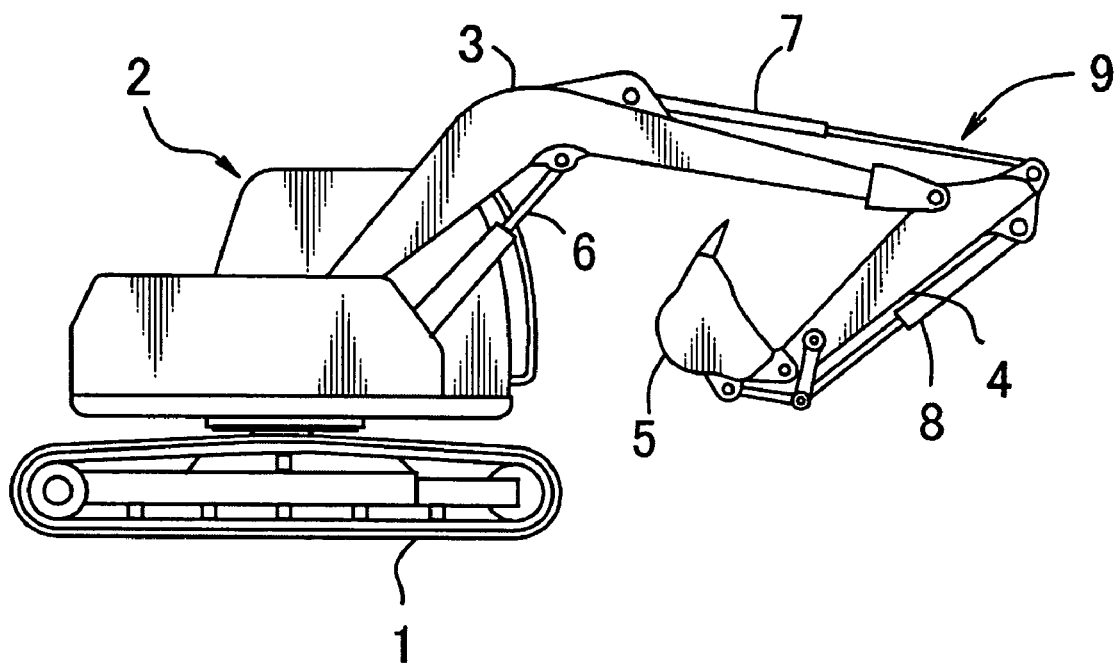
FIG. 1 is a schematic side view of an excavator as one object intended to apply the present invention thereto.

FIG. 1 shows an excavator as one object intended to apply the present invention thereto.

This excavator comprises a crawler undercarriage 1, and a revolving superstructure 2 mounted on the crawler undercarriage 1 rotatably about a vertical axis. The revolving superstructure 2 is provided with a plurality of work (excavation) attachments which include a boom 3, an arm 4, a bucket 5, and boom, arm and bucket hydraulic cylinders 6, 7, 8 for driving the boom, the arm and the bucket, respectively.

Figure 2:
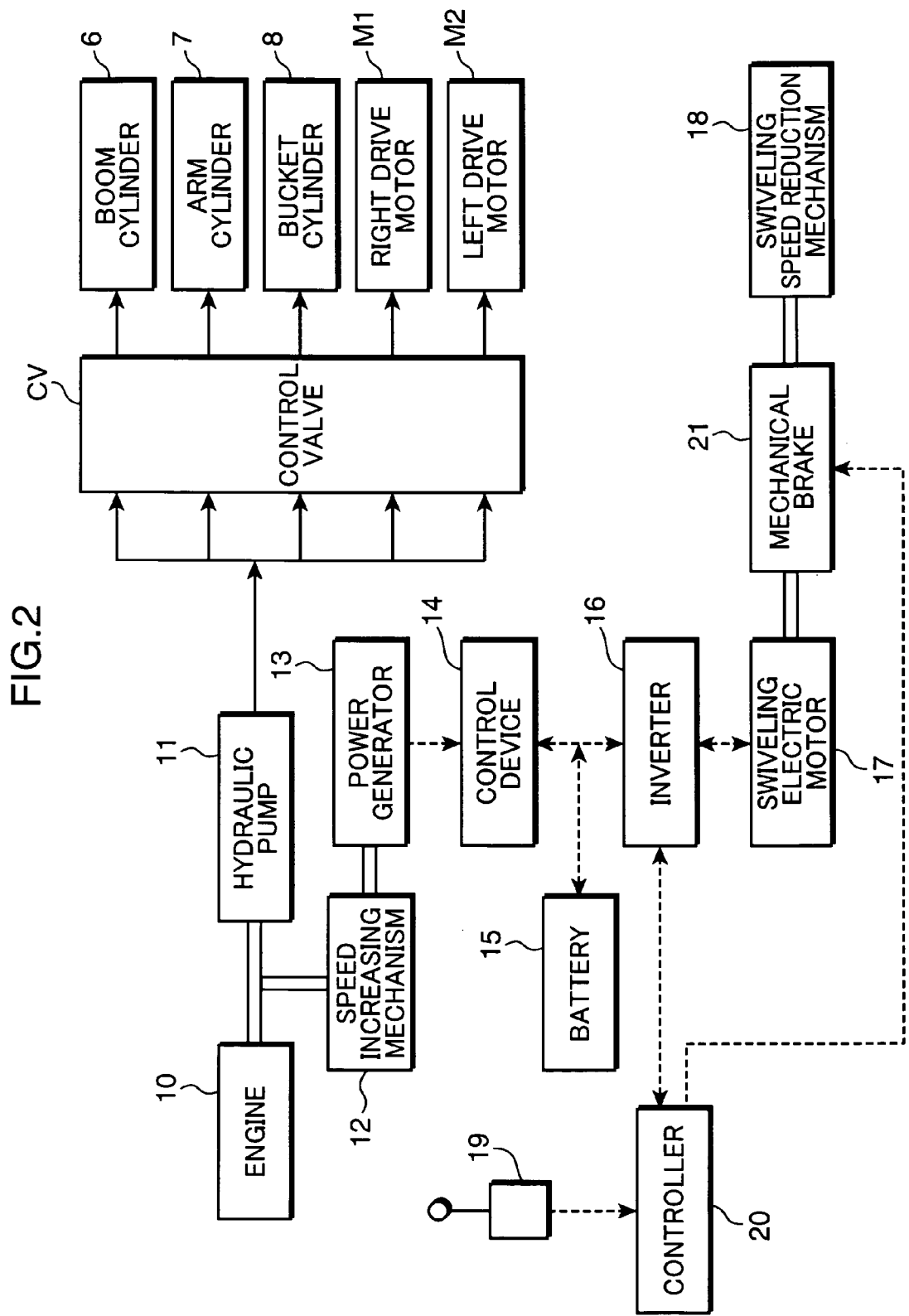
FIG. 2 is a block diagram showing an embodiment of the present invention.

FIG. 2 shows a block diagram of a drive/control system for the entire excavator. As shown in FIG. 2, there is driven a hydraulic pump 11 by an engine 10, and a discharge oil from the hydraulic pump 11 is supplied to each of the hydraulic cylinders 6 to 8 and a pair of right and left drive motors M1, M2 for drivingly traveling the undercarriage 1, through a control valve CV (while a plurality of control valves are actually provided on an actuator-by-actuator basis, they are illustrated as a single valve block in FIG. 2).

A power generator 13 is coupled to the engine 10 through a speed increasing mechanism 12. The power generator 13 produces electric power, which is accumulated in a battery 15 through a control device 14 for controlling a current and a voltage, and is applied to a swiveling electric motor 17 through an inverter 16. This rotates the swiveling electric motor 17, and the resulting torque is transmitted to the revolving superstructure 2 through a swiveling speed reduction mechanism 18 to rotate the revolving superstructure 2 counterclockwise or clockwise.

The reference numeral 19 indicates a lever-type swiveling manipulation section (e.g. potentiometer). In a normal state, a controller 20 gives the inverter 16 a command based on a manipulated signal from the swiveling manipulation section 19 to control acceleration, deceleration and stop-holding of the swiveling electric motor 17 in accordance with the command.

The swiveling electric motor 17 is inverter-controlled to act as an electric motor using electric power from at least either one of the power generator and the battery 15 during the acceleration of swiveling, and is inverter-controlled to act as a power generator during the deceleration to store regenerative electric power in the battery 15.

The swiveling electric motor 17 is also associated with a mechanical brake 21 for generating a mechanical braking force.

Figure 3:
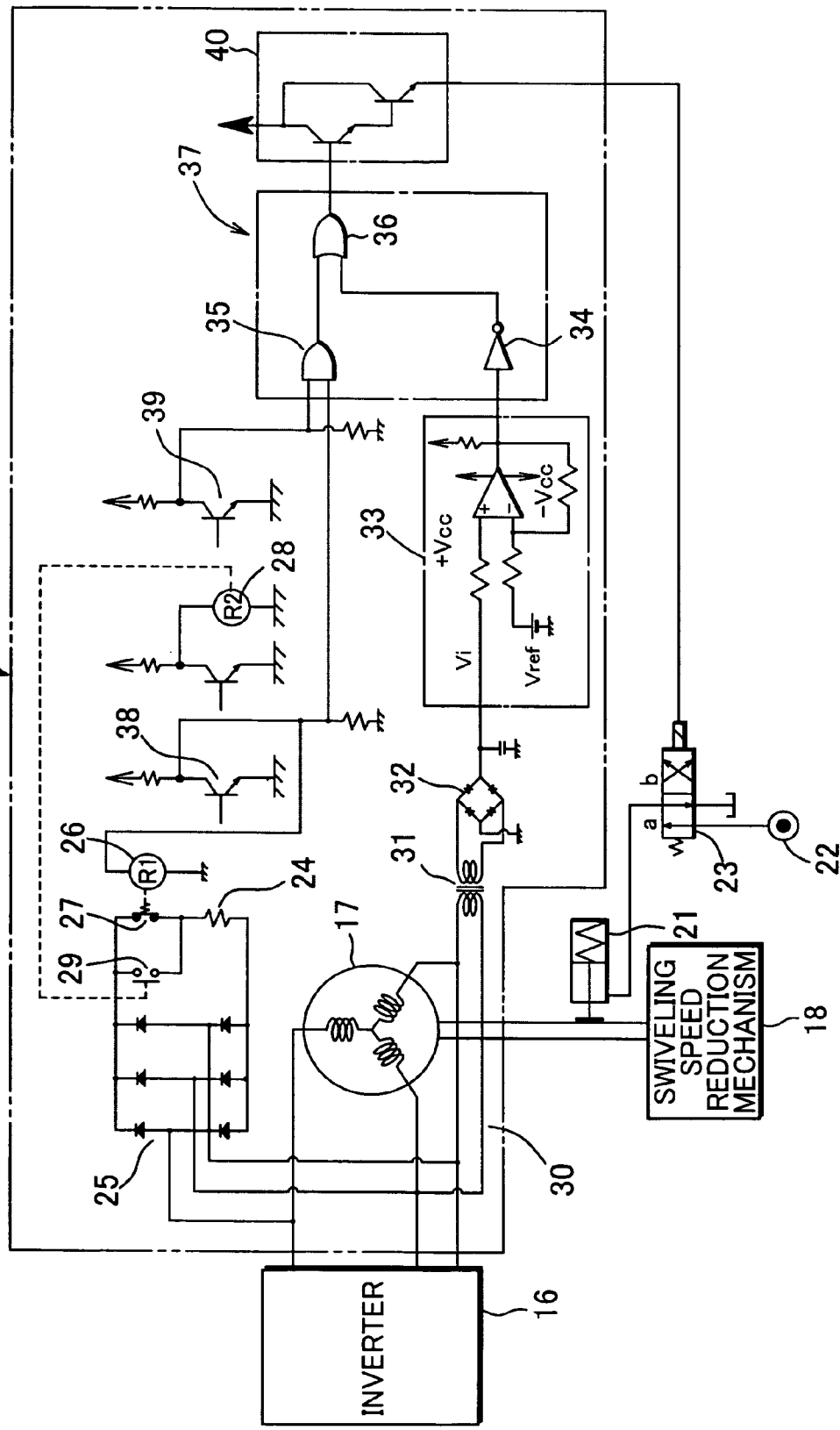
FIG. 3 is a circuit diagram of a braking circuit in the embodiment.

As shown in FIG. 3, the mechanical brake 21 is designed as a hydraulic negative brake adapted to release a braking force when a hydraulic pressure is introduced therein from a braking hydraulic pressure source 22 through a solenoid selector valve 23. The operation-release of the mechanical brake 21 permits a swiveling operation.

There will be described the configuration of a braking circuit for controlling a braking operation in an emergency with reference to FIG. 3.

The swiveling electric motor 17 is composed using a permanent magnet-type electric motor adapted to generate electric power based on inertia rotation even when power supply thereto is interrupted, and supply the generated electric power to a braking resistor 24 arranged outside the motor 17 so as to make an electric braking function.

The braking resistor 24 has a branching connection to respective feed lines of the swiveling electric motor 17 through a rectifier circuit 25, and is supplied with a current when a normally-closed contact 27 of a first relay 26 or a normally-open contact 29 of a second relay 28 is turned on.

The reference numeral 30 indicates a voltage detection circuit for detecting a voltage generated by the swiveling electric motor 17. An output of the voltage detection circuit 30 is sent as an input voltage Vi to one terminal of a voltage comparator circuit 33 serving as speed detection means, through a transformer 31 and a rectifier circuit 32 and compared with a preset value Vref.

Specifically, the current flowing through the braking resistor 24 is reduced in proportion to a lowering of a rotation speed of the swiveling electric motor 17 (revolving superstructure 2), and the output of the voltage detection circuit 30 is also lowered in proportion to the reduction of the current. Thus, the voltage comparator circuit 33 can determine whether the rotation speed becomes equal to or less than a preset value. More specifically, a signal "L" is output when Vi≧Vref, and a signal "H" is output when Vi<Vref.

There is connected a logic circuit 37 having NOT, AND and OR elements 34, 35, 36 and serving as an output circuit to an output side of the voltage comparator circuit 33, an output of which is input into the NOT element 34.

Into the AND element 35 are input an output from a watchdog transistor 38 for monitoring the occurrence of a malfunction of the controller 20 ("H" in the normal state, "L" in the malfunction state), and an output of a mechanical-brake command output transistor 39 for outputting an activation or deactivation command from the controller 20 to the mechanical brake 21 ("L" for the activation command, "H" for the deactivation command). Respective outputs of the NOT element 34 and the AND element 35 are input into the OR element 36.

To an output side of the OR element 36 is connected an amplifier circuit 40. When a signal "H" is output from the OR element 36 (normal state), the deactivation signal is output to the solenoid selector valve 23 through the amplifier circuit 40.

In response to the deactivation signal, the selector valve 23 is switched from a braking activation position "a" on the left side in FIG. 3 to a braking deactivation position "b" on the right side to deactivate the mechanical brake 21.

The following Table 1 is a logic value table with respect to respective items of: the output of the mechanical-brake command output transistor 39; the output of the watchdog transistor 38; the electric motor speed; and the activation of the mechanical brake. According to this logic value table, the following operation is performed.

TABLE 1

| Output of mechanical-brake command output transistor 39 | Output of watchdog transistor 38 | Electric motor speed | Activation of mechanical brake 21 |
|---|---|---|---|
| deactivation (H) | normal (H) | high speed (H) | deactivation (H) |
| deactivation (H) | normal (H) | low speed (L) | deactivation (H) |
| activation (L) | normal (H) | high speed (H) | deactivation (H) |
| activation (L) | normal (H) | low speed (L) | activation (L) |
| deactivation (H) | malfunction (L) | high speed (H) | deactivation (H) |
| deactivation (H) | malfunction (L) | low speed (L) | activation (L) |
| activation (L) | malfunction (L) | high speed (H) | deactivation (H) |
| activation (L) | malfunction (L) | low speed (L) | activation (L) |

(I) When the watchdog transistor 38 outputs the signal "H" representing the normal state of the controller, and the mechanical-brake command output transistor 39 outputs the signal "H" representing the mechanical-brake deactivation command, the OR element outputs "H" irrespective of the electric motor speed to maintain the mechanical brake 21 in the deactivated state.

(II) When the watchdog transistor 38 outputs the signal "H" representing the normal state of the controller, and the mechanical-brake command output transistor 39 outputs the signal "L" representing the mechanical-brake activation command, the OR element outputs "H" for the electric motor speed higher than the preset value to deactivate the mechanical brake 21, and outputs "L" for the electric motor speed lower than the preset value to activate the mechanical brake 21.

(III) When the output of the watchdog transistor 38 is changed to "L" due to occurrence of a malfunction of the controller 20, the OR element outputs "H" for the electric motor speed higher than the preset value to deactivate the mechanical brake 21, and outputs "L" for the electric motor speed lower than the preset value to activate the mechanical brake 21, irrespective of the output of the mechanical-brake command output transistor 39.

The relay contact 27 is turned off in the normal state of the controller, and turned on in the malfunction state of the controller. The relay contact 29 is turned on in response to a signal sent from the controller 20 when power supply to the electric motor is interrupted.

In summary, a) When a malfunction occurs in the controller 20 due to interruption in power supply to the controller, a failure of the controller itself, etc., the relay contact 27 is turned on.

b) When power supply to the electric motor is interrupted due to a failure of the power generator 13, etc., and the controller 20 operates normally, the controller 20 detects the interruption in power supply, based on voltage reduction for example, and then activates the second relay 28 to turn on the relay contact 29.

c) When power supply to the electric motor is interrupted, and a malfunction occurs in the controller 20, the output of the watchdog transistor 38 indicates the malfunction, thereby turning on the relay contact 27.

Thus, in either case, a current flows through the braking resistor 24 to effect an electric braking to decelerate the swiveling electric motor 17. Then, when the electric motor speed is reduced to a preset value, the mechanical brake 21 is activated.

Figure 4:
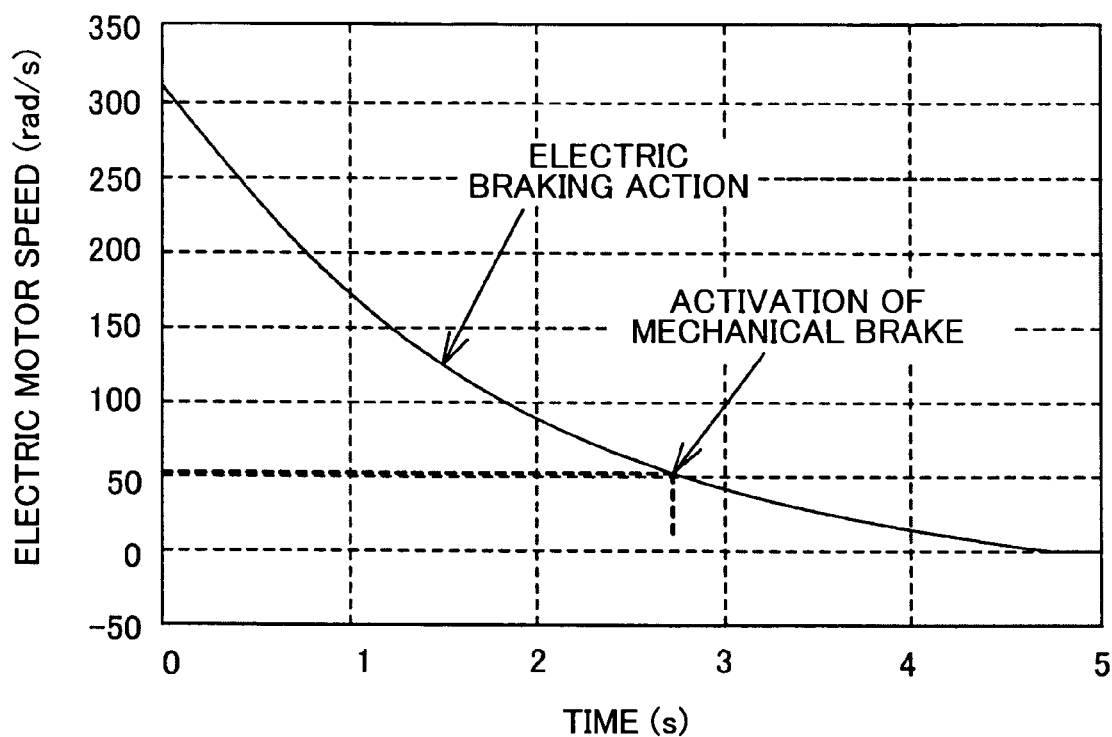
FIG. 4 is a graph showing an activation timing of an electric braking and a mechanical brake.

According to the above operation, the swiveling electric motor 17 (revolving superstructure 2) is automatically decelerated by the electric braking as shown in FIG. 4 in an emergency, and then stopped and held in the stopped state by the mechanical brake 21 activated when the rotation speed becomes equal to or lower than a preset value during the decelerating.

In this operation, a torque of the electric braking is determined by a value of the braking resistor 24, in such a manner as to be maximized at the start of deceleration from a maximum speed, and then reduced along with lowering of the rotation speed (speed of the inertia rotation).

The maximum torque of the electric braking in the emergency is preferably set at a value approximately equal to a maximum braking torque of the electric motor in the normal state, by the following reason.

Figure 5:
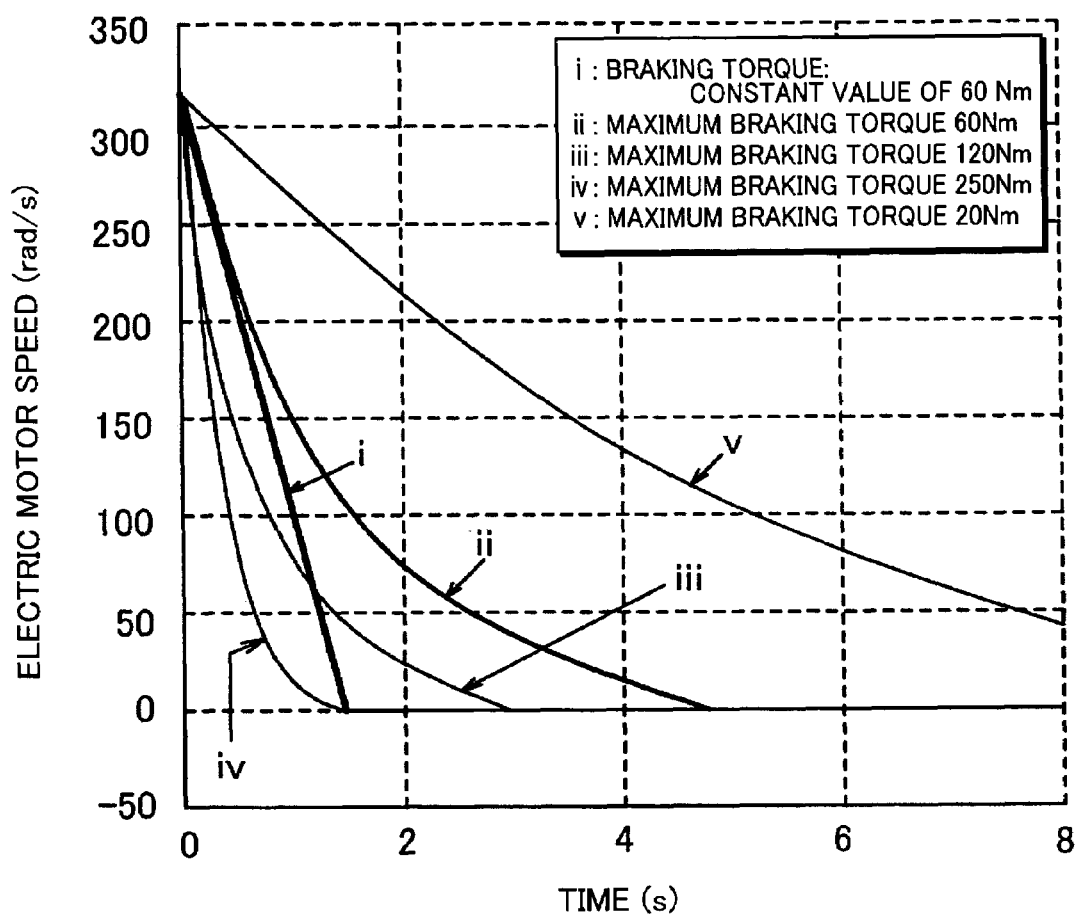
FIG. 5 is a graph showing a relationship of a maximum torque of the electric braking, and a braking time and an electric motor speed, in a plurality of patterns.
Figure 6:
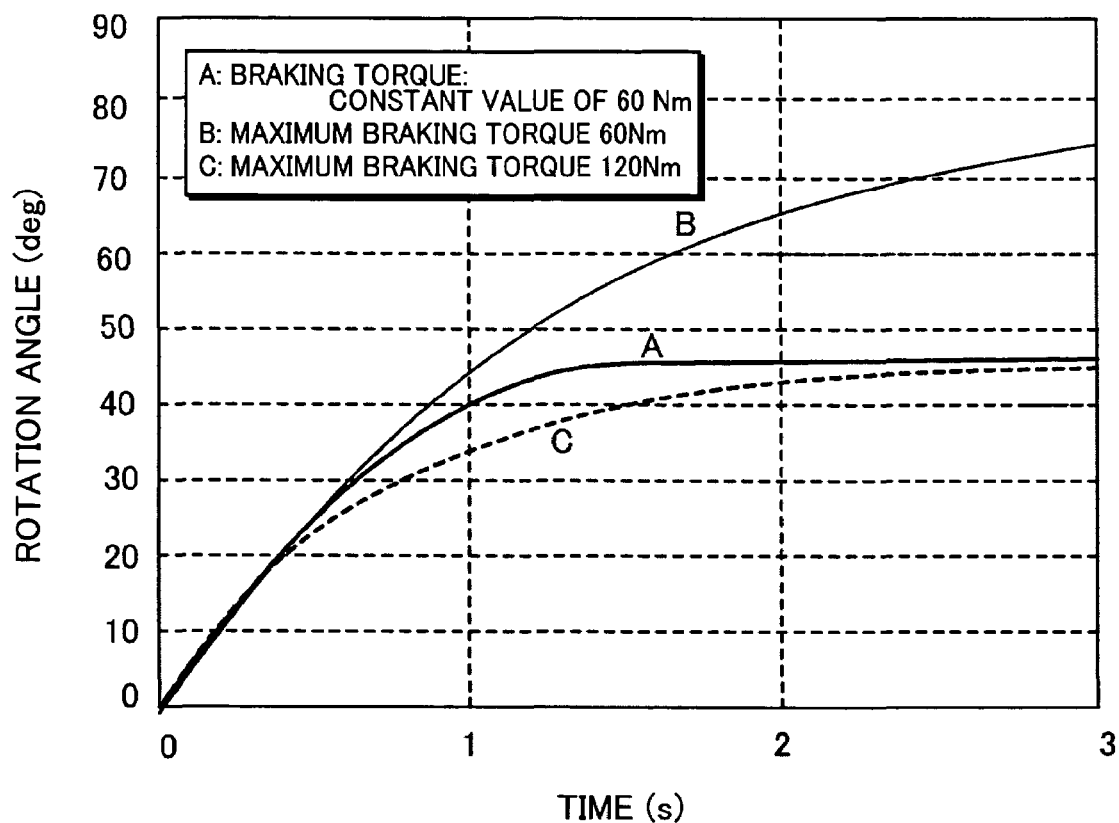
FIG. 6 is a graph showing a relationship of the maximum torque of the electric braking, and the braking time and a rotation angle, in a plurality of patterns.

FIG. 5 shows a relationship between a time during braking in an emergency and an electric motor speed, and FIG. 6 shows a relationship between a time and a rotation angle necessary for stop.

A braking operation under the maximum braking torque of the electric motor in the normal state, which is a braking under a constant torque and a constant acceleration, exhibits characteristics as indicated by the linear line "i" in FIG. 5 and the curve A in FIG. 6 (efficiency is ignored).

On the other hand, a braking operation in such a manner the maximum torque of the electric braking in the emergency is set to be equal to the maximum braking torque of the electric motor in the normal state, exhibits characteristics as indicated by the curve "ii" in FIG. 5 and the curve B in FIG. 6, with both the time necessary for stop and the braking distance (angle) greater than those ("i", A) in the normal state.

From this perspective, if a braking operation is performed setting the curve C in FIG. 6 as a target characteristic so that the braking distance is equal to that in the normal state, the maximum torque of the electric braking will be increased to about two times greater than that in the normal state. This doubles a torque load on each of the swiveling electric motor 17 and the speed reduction mechanism 18, causing a problem of heat generation due to a current flowing through an internal resistance of the electric motor 17 (the heat generation is proportional to the current to the 2nd power) and a problem about strength of the speed reduction mechanism 18.

Alternatively, if a braking operation is performed setting the curve "iv" in FIG. 5 as a target characteristic so that the braking time is equal to that in the normal state, the maximum torque of the electric braking will be further increased to be impractical.

Alternatively, if a braking operation is performed setting the maximum torque of the electric braking lower than the maximum braking torque of the electric motor in the normal state, exhibited is a characteristic as indicated by the curve "v" in FIG. 5. This characteristic has neither the problem of heat generation in the electric motor 17 nor the problem about strength of the speed reduction mechanism 18, but requires an excessively long time for stop and an extreme braking angle, which causes a problem about safety.

In view of the above factors, it is the most desirable selection to set the maximum torque of the electric braking in the emergency at a value equivalent to the maximum braking torque of the electric motor in the normal state, and activate the mechanical brake 21 when the rotation speed becomes equal to or lower than a preset value.

The electric motor speed (rotation speed) as the basis for activating the mechanical brake 21 is determined in consideration of reducing a heat load on the mechanical brake 21 to prevent damage thereof (or avoid an increase in size due to the purpose for preventing the damage, when possible), and of reducing the braking time and the braking distance. Typically, the mechanical brake 21 is activated at a time when the rotation speed is reduced to a quite low value (e.g. about 50 rad/s), as shown in FIG. 4.

Alternatively, the mechanical brake 21 may be activated when the speed is reduced to zero or approximately zero by the electric braking. In this case, the electric braking provides a primary braking action, and the mechanical brake 21 primarily provides a stop-holding action.

In the above embodiment, the electric braking circuit is designed such that the voltage detection circuit 30 detects a terminal voltage of the braking resistor 24 as a rotation speed, and the voltage comparator circuit 33 compares the detected voltage with the preset value to determine whether the rotation speed is higher, equal, or lower than the preset value, so as to perform the above control. Alternatively, the electric braking circuit is designed to detect a current flowing through the braking resistor 24, compare the detected current with a preset current value to determine whether the rotation speed is higher, equal, or lower than the preset value, and then perform the same control.

Alternatively, a rotation speed of the swiveling electric motor 17 or the swiveling speed reduction mechanism 18, or a rotation speed of the revolving superstructure 2, may be directly detected by a speed sensor, and then compared with a preset value by the controller 20 or another comparison section. In this case, as the speed sensor is desirably used a type designed to operate even during a failure of a power supply (tacho-generator, for example).

The mechanical brake 21 is not limited to a cylinder structure in the above embodiment, but may be a hydraulically-driven or electrically-driven disc brake or the like.

As mentioned above, the swiveling electric motor is composed using a permanent magnet-type electric motor designed to make an electric braking function by allowing electric power generated based on inertial rotation to be consumed in an external braking resistor. In an emergency, the electric braking action of the swiveling electric motor brakes and decelerates the revolving superstructure and, when the rotation speed of the revolving superstructure becomes equal to or less than a preset value (when the rotation speed is reduced to a low value, or the revolving superstructure is stopped), the mechanical brake is activated to stop the rotation and hold the stopped revolving superstructure. This enables stopping the revolving superstructure from rotating quickly, even in the event of a malfunction of a drive or control system.

In addition, the mechanical brake, activated only at a low speed or in a stopped state, is in no danger of damages even if a standard equipment of the work machine is directly used as the mechanical brake. Even when this mechanical brake is modified to have enhanced braking performance, it may be maintained in a small size without the need for a large cooling device causing an increase in size.

Further, a comparison section may compare a value of voltage or current resulting from a power generating action of the swiveling electric motor with a preset value, and the mechanical brake is may be activated based on a result of the comparison by the comparison section. In this case, there is no need to provide an additional speed sensor for detecting an activation timing of the mechanical brake. This can bring down costs and reduce the risk of occurrence of a failure or malfunction as compared with an external sensor.

As speed detection means a speed sensor may be employed for detecting a rotation speed of the swiveling electric motor or the speed reduction mechanism of the swiveling electric motor. This can facilitate the speed detection itself while a speed sensor is additionally required.

Further, a maximum torque of the electric braking (a torque at a time of the start of deceleration from a maximum speed) may be set at a value approximately equal to a maximum braking torque of the swiveling electric motor in a normal state. This makes it possible to ensure a value close to that in the normal state in terms of a time and distance (angle) necessary for stopping the rotation, while preventing an excessive torque from acting on the electric motor (including the speed reduction mechanism).

INDUSTRIAL APPLICABILITY

The present invention brings about a valuable effect of allowing, in an emergency, a revolving superstructure to be quickly decelerated and stopped from rotating while preventing damage of a mechanical brake.

What is claimed is:

1. A method for braking a revolving superstructure of a work machine, comprising:
    employing a permanent magnet-type electric motor as a swiveling electric motor for drivingly swiveling said revolving superstructure;
    in an emergency, allowing electric power generated in said swiveling electric motor due to inertial rotation to be consumed in a braking resistor outside said swiveling electric motor to provide an electric braking action, said electric braking action providing braking and decelerating the revolving superstructure; and
    activating a mechanical brake when a rotation speed of the revolving superstructure becomes equal to or lower than a preset value during said decelerating.

2. A system for braking a revolving superstructure of a work machine, comprising:
    a swiveling electric motor for drivingly swiveling said revolving superstructure;
    a mechanical brake for mechanically braking said swiveling electric motor;
    a controller for controlling respective operations of said swiveling electric motor and said mechanical brake; and
    a speed detector for detecting a rotation speed of said revolving superstructure,
    wherein:
    said swiveling electric motor is composed using a permanent magnet-type electric motor designed to make an electric action by allowing electric power generated due to inertial rotation to be consumed in a braking resistor outside said swiveling electric motor; and
    said controller is adapted to allow said swiveling electric motor to make the electric braking action in an emergency, and to activate said mechanical brake, based on a speed signal generated from said speed detector, when the rotation speed of the revolving superstructure becomes equal to or lower than a preset value by said electric braking action.

3. The system as defined in claim 2, wherein:
    said mechanical brake is composed using a hydraulic negative brake adapted to release a braking force when a hydraulic pressure is introduced therein through a selector valve; and
    said controller is adapted to control operation of said selector valve.

4. The system as defined in claim 2, wherein:
    said speed detector includes a comparison section for comparing a value of voltage or current resulting from a power generating action of said swiveling electric motor with a preset value; and
    said mechanical brake is designed to be activated based on a result of the comparison by said comparison section.

5. The system as defined in claim 2, wherein said speed detector is composed using a speed sensor for detecting a rotation speed of said swiveling electric motor or a speed reduction mechanism of said swiveling electric motor.

6. The system as defined in claim 2, which is designed such that a maximum torque to be obtained by the electric braking action of said swiveling electric motor is set at a value approximately equal to a maximum braking torque of said swiveling electric motor in a normal state.

7. A system for braking a revolving superstructure of a work machine, comprising:
    a swiveling electric motor for drivingly swiveling said revolving superstructure;
    a mechanical brake for mechanically braking said swiveling electric motor;
    control means for controlling respective operations of said swiveling electric motor and said mechanical brake; and
    speed detection means for detecting a rotation speed of said revolving superstructure,
    wherein:
    said swiveling electric motor is composed using a permanent magnet-type electric motor designed to make an electric action by allowing electric power generated due to inertial rotation to be consumed in a braking resistor outside said swiveling electric motor; and
    said control means is adapted to allow said swiveling electric motor to make the electric braking action in an emergency, and to activate said mechanical brake, based on a speed signal generated from said speed detection means, when the rotation speed of the revolving superstructure becomes equal to or lower than a preset value by said electric braking action.

8. The system as defined in claim 7, wherein:
    said mechanical brake is composed using a hydraulic negative brake adapted to release a braking force when a hydraulic pressure is introduced therein through a selector valve; and
    said control means is adapted to control operation of said selector valve.

9. The system as defined in claim 7, wherein:
said speed detection means includes a comparison section for comparing a value of voltage or current resulting from a power generating action of said swiveling electric motor with a preset value; and
said mechanical brake is designed to be activated based on a result of the comparison by said comparison section.

10. The system as defined in claim 7, wherein said speed detection means is composed using a speed sensor for detecting a rotation speed of said swiveling electric motor or a speed reduction mechanism of said swiveling electric motor.

11. The system as defined in claim 7, which is designed such that a maximum torque to be obtained by the electric braking action of said swiveling electric motor is set at a value approximately equal to a maximum braking torque of said swiveling electric motor in a normal state.

* * * * *